(12) United States Patent
Yous et al.

(10) Patent No.: US 9,196,054 B2
(45) Date of Patent: Nov. 24, 2015

(54) METHOD AND SYSTEM FOR RECOVERY OF 3D SCENE STRUCTURE AND CAMERA MOTION FROM A VIDEO SEQUENCE

(75) Inventors: Sofiane Yous, Dublin (IE); Peter Redmond, Dublin (IE); Gerard Lacey, Wicklow (IE)

(73) Assignee: The Provost, Fellows, Foundation Scholars, and Other Members of Board of the College of the Holy and Undivided Trinity of Queen Elizabeth Near Dublin, Dublin (IE)

( * ) Notice: Subject to any disclaimer, the term of this patent is extended or adjusted under 35 U.S.C. 154(b) by 135 days.

(21) Appl. No.: 13/884,163

(22) PCT Filed: Nov. 11, 2011

(86) PCT No.: PCT/EP2011/069762
§ 371 (c)(1),
(2), (4) Date: Dec. 23, 2013

(87) PCT Pub. No.: WO2012/062813
PCT Pub. Date: May 18, 2012

(65) Prior Publication Data
US 2014/0147032 A1    May 29, 2014

(30) Foreign Application Priority Data
Nov. 9, 2010   (IE) .................................. S2010/0714

(51) Int. Cl.
*G06K 9/00* (2006.01)
*G06T 7/20* (2006.01)
*G06T 7/00* (2006.01)

(52) U.S. Cl.
CPC ............. *G06T 7/2033* (2013.01); *G06T 7/0042* (2013.01); *G06T 7/0065* (2013.01); *G06T 2207/10016* (2013.01); *G06T 2207/30244* (2013.01)

(58) Field of Classification Search
USPC ........................................................ 382/154
See application file for complete search history.

(56) References Cited

U.S. PATENT DOCUMENTS

| | | | |
|---|---|---|---|
| 7,595,817 B1 * | 9/2009 | Zhang | 348/155 |
| 8,717,418 B1 * | 5/2014 | Prince | 348/46 |
| 2007/0081714 A1 | 4/2007 | Wallack et al. | |
| 2007/0253618 A1 * | 11/2007 | Kim et al. | 382/154 |
| 2010/0296724 A1 * | 11/2010 | Chang et al. | 382/154 |

OTHER PUBLICATIONS

Bay et al., "SURF: Speeded UP Robust Features," Proceedings of the Ninth European Conference on Computer Vision, 2006, 14 pgs.

(Continued)

*Primary Examiner* — Yon Couso
(74) *Attorney, Agent, or Firm* — K&L Gates LLP (57) ABSTRACT

An improved method and a system are disclosed for recovering a three-dimensional (3D) scene structure from a plurality of two-dimensional (2D) image frames obtained from imaging means. Sets of 2D features are extracted from the image frames, and sets corresponding to successive image frames are matched, such that at least one pair of matched 2D features refers to a same 3D point in a 3D scene captured in 2D in the image frames. A 3D ray is generated by back-projection from each 2D feature, and the generated 3D rays are subjected to an anchor-based minimization process, for determining camera motion parameters and 3D scene points coordinates, thereby recovering a structure of the 3D scene.

16 Claims, 9 Drawing Sheets

(56) References Cited

OTHER PUBLICATIONS

Longuet-Higgins, "A computer algorithm for reconstructing a scene from two projections," Nature, 293:133-135, Sep. 10, 1981.
Lowe, "Distinctive Image Features from Scale-Invariant Keypoints," International Journal of Computer Vision, 2004, 28 pgs.
Moisan et al., "A Probabilistic Criterion to Detect Rigid Point Matches Between Two Images and Estimate the Fundamental Matrix," International Journal of Computer Vision, 57(3):201-218, 2004.
Ronnholm et al., "A method for Interactive Orientation of Digital Images Using Backprojection of 3D Data," The Photogrammetric Journal of Finland, 18(2):58-69, 2003.
Written Opinion of the International Searching Authority for PCT/EP2011/069762 filed on Nov. 9, 2011; opinion mailed May 21, 2012; 6 pgs.
Ariyawansa et al., "High-speed correspondence for object recognition and tracking," Proceedings of SPIE, vol. 3174, Jul. 7, 1997, XP055167298, ISSN: 0277-786X, DOI: 10.1117/12.279801, 11 pp.
Clarke et al., "Automated Three Dimensional Measurement Using Multiple CCD Camera Views," The Photogrammetric Record, 15(85):27-42, Apr. 1, 1995, XP055167302, ISSN: 0031-868X, DOI: 10.1111/0031-868X.00003.
Cyganek et al., "Space Reconstruction and Multiview Integration," In: "An Introduction to 3D Computer Vision Techniques and Algorithms," Jan. 1, 2009, Wiley, XP055156910, ISBN:978-0-470-01704-3, pp. 323-342, DOI: 10.1002/9780470699720.
Hess-Flores et al., "Ray Divergence-Based Bundle Adjustment Conditioning for Multi-View Stereo," Jan. 1, 2012, Advances in Image and Video Technology, Springer Berlin Heidelberg, pp. 153-164, XP019170127, ISBN: 978-3-642-25366-9.
Knoblauch et al., "Factorization of correspondence and camera error for unconstrained dense correspondence applications," Nov. 30, 2009, Advances in Visual Computing, Springer Berlin Heidelberg, pp. 720-729, XP019134416, ISBN: 978-3-642-10330-8.
Schinstock et al., "An Alternative Cost Function to Bundle Adjustment Used for Aerial Photography From UAVS," ASPRS 2009 Annual Conference, Baltimore, Maryland, Mar. 9, 2009, 8 pp., XP055167293, URL:http://info.asprs.org/publications/proceedings/baltimore09/0110.pdf.
Triggs et al., "Bundle Adjustment—A Modern Synthesis," Lecture Notes in Computer Science/Computational Science (Eurocrypt) Ches 2008, Springer, DE, vol. 1883, Jan. 1, 2000, pp. 298-372, XP009097330, ISBN: 978-3-540-24128-7.

\* cited by examiner

METHOD AND SYSTEM FOR RECOVERY OF 3D SCENE STRUCTURE AND CAMERA MOTION FROM A VIDEO SEQUENCE

CROSS REFERENCE TO RELATED APPLICATIONS

This application is the national phase under 35 U.S.C. §371 of International Application No. PCT/EP2011/069762, filed on Nov. 9, 2011, which claims priority to and the benefit of Irish Patent Application No. S2010/0714, filed on Nov. 9, 2010, the entire disclosures of each of which are incorporated by reference herein.

FIELD OF THE INVENTION

The present invention relates to a method and system for the estimation of camera motion and the recovery of a 3D scene structure from a plurality of image frames.

BACKGROUND OF THE INVENTION

Many methods and systems are known for deriving three-dimensional ('3D') information from a plurality of two-dimensional ('2D') image frames, for instance photographs. H. Bay, T. Tuytelaars and L. Van Gool (*Speeded Up Robust Features*, Proceedings of the Ninth European Conference on Computer Vision, 2006) and Lowe (*Distinctive Image Features from Scale-Invariant Keypoints*, International Journal of Computer Vision, 2:91-110, 2004) teach respective techniques for extracting sets of 2D features from image frames and matching sets respectively extracted from successive frames, such that each pair of matched features refers to a same 3D point in a scene captured in the image frames.

A more widespread use of these methods in image processing applications referred to as 'augmented reality' applications, the purpose of which is to embed, impart or map additional information to 2D image data captured in real-time by imaging means, remains impeded by the amount of data processing resources required for accurately extracting 3D data from 2D image data.

The constant growth of air travel over the past decades has resulted both in larger aircrafts being constantly developed for carrying ever more passengers and cargo, recently resulting in such large airliners as the Airbus A380, Boeing 747-8 and Antonov An225, and in ever-increasing congestion on airport ramps and taxiways for aircrafts of all sizes. There has been a corresponding increase in flight support traffic and other airport features moving adjacent aircrafts, miscellaneously comprising fuel tenders, mobile stairs, articulated jet bridges, servicing trolleys, luggage trains and more.

Despite the pace and extent of aircraft technical developments, ground manoeuvring for aircraft remains essentially reliant on visual observation by the pilot crew, whose situational awareness may at times be impeded by a sensory overload resulting from a busy ground environment. The combination of the above factors has contributed, and continues to contribute, to an increase in ground collisions, at an annual cost last estimated at $11 bn in 2007.

Many modern aircrafts now include what is known as a "glass cockpit", a flight navigation data processing system which relays environmental information gathered in real time by a multitude of onboard sensors such as a Global Positioning System, laser range finder, ground radar, odometer, Inertial Measurement Unit and more to the pilot crew via multi-functional digital instrument displays. This advanced feature remains a sub-optimal solution for mitigating the ground manoeuvring risks described above, even when the aircraft includes a real-time 2D video or digital image frame feed to the crew from one or more cameras located about the aircraft, since the 2D image data on a relevant instrument display lacks distance information, which other onboard sensors may yet relay, but in a visually counter-intuitive or dissociative form on a different instrument display, or an alternative user interface if the same instrument display must be used.

It would therefore be advantageous to provide an improved method and system, in which the processing of image data for the estimation of camera motion and the recovery of a 3D scene structure from a plurality of image frames requires comparatively less data processing resources relative to known solutions.

It would also be advantageous to provide such a system to assist the situational awareness of vehicle operators, particularly aircraft pilots, during manoeuvring in densely-populated and/or fast-changing environments.

SUMMARY OF THE INVENTION

The present invention provides an improved method and system for extracting three-dimensional ('3D') data from two-dimensional ('2D') source data in real-time. The method and system of the invention uses a ray—based rather than a point—based approach for calculating the camera position in a 3D scene, and outperforms the state of the art in terms of accuracy, because the method does not accumulate calculation errors inherent to a projection-estimation back-projection approach; in terms of processing speed since, unlike known approaches, 3D points are not part of the estimation vector during the bundle adjustment step, thus reducing the processing load; in terms of scalability, since the ray-based structure facilitates the use of a single computational framework for multiple cameras distributed around a rigid structure moving through space.

According to an aspect of the present invention, there is therefore provided a method of recovering a 3D scene structure from a plurality of image frames obtained from imaging means, the method comprising the steps of extracting a first set of 2D features from a first image frame, extracting a second set of 2D features from a second image frame, matching the second set with the first set, such that at least one pair of matched 2D features refers to a same 3D point in a 3D scene, generating a 3D ray by back-projection from each 2D feature, and subjecting the generated 3D rays to an anchor-based minimization process, for determining camera motion parameters and 3D scene points coordinates, thereby recovering a structure of said 3D scene. The method preferably comprises the further step of processing the determined camera motion parameters using 3D ray intersection according to a function presented and claimed hereafter.

The anchor-based minimization process preferably comprises a step of selecting a 3D point in the 3D scene as an anchor, being a centre of rotation, whereby camera motion is expressed as a convolution of an initial motion that transform a 3D ray from the first image frame into a corresponding view in the second image frame, and a rotation around the selected anchor. The initial motion may be one or any combination of a pure translation, a pure rotation and a pure scaling.

The method preferably comprises the further step of processing the amount of pure translation of the camera for bringing the 3D ray connecting the camera to the anchor for intersecting with the image plan at $I_2$ according to a function presented and claimed hereafter.

The minimization-based motion parameters estimation algorithm comprises several steps presented and claimed hereafter, which and return a rotation matrix R and a translation vector T.

In one embodiment, the intersection of the respective 3D rays of the at least one pair of matched 2D features corresponds to the related 3D points.

In one embodiment, the method comprises the step of using a ray-ray bundle adjustment.

In one embodiment the method wherein the anchor-based process comprising the step of selecting an anchor point in space as the centre of rotation, such that the camera motion parameters can be expressed as a convolution of two motions.

In one embodiment the first motion transforms a ray from a first view into a corresponding view in a second view and a second motion comprises a rotation around a selected anchor point.

In one embodiment the method comprises the step of simultaneously recovering motion parameters and 3D points.

According to another aspect of the present invention, there is provided a system for recovering a 3D scene structure from a plurality of image frames obtained from imaging means, said system comprising the imaging means and data processing means interfaced with the imaging means, the data processing means being configured to extract a set of 2D features from each image frame, match each set with a set extracted from the previous image frame, such that at least one pair of matched 2D features refers to a same 3D point in a 3D scene, generate a 3D ray by back-projection from each 2D feature, and subject the generated 3D rays to an anchor-based minimization process, for determining camera motion parameters and 3D scene points coordinates, thereby recovering a structure of said 3D scene.

The imaging means is preferably selected from the group comprising one or more analogue cameras, digital cameras, stereoscopic cameras, plenoptic cameras, networked cameras. The imaging means may advantageously be interfaced to the data processing means with a wireless data link.

The system may be usefully embodied in the onboard navigation system of a large complex vehicle such as an aircraft, land transport vehicle or sea transport vehicle. More preferably still, the system may be embodied in the flight management system of an airliner.

According to a further aspect of the present invention, there is provided a set of instructions recorded on a data carrying medium which, when processed by a data processing terminal connected to imaging means and obtaining image frames therefrom, configures the terminal to perform the steps of extracting a first set of 2D features from a first image frame, extracting a second set of 2D features from a second image frame, matching the second set with the first set, such that at least one pair of matched 2D features refers to a same 3D point in a 3D scene, generating a 3D ray by back-projection from each 2D feature, and subjecting the generated 3D rays to an anchor-based minimization process, for determining camera motion parameters and 3D scene points coordinates, thereby recovering a structure of said 3D scene.

The data processing terminal is preferably onboard a vehicle. In particular, the set of instructions may be embodied in an aircraft user application, wherein the data processing terminal comprises an aircraft flight management system.

According to yet another aspect of the present invention, there is provided a user interface for use with the system or output by the set of instructions respectively described above, to which the recovered structure of the 3D scene is output.

The user interface may further comprise at least one non-moving reference indicator, located substantially at the centre of the user interface, and at least one reference indicator corresponding to an environmental feature and/or hazard determined as a 3D point from the camera image data, which the user interface translates and/or rotates relative to the at least one non-moving reference indicator in use.

Preferably, the user interface is further adapted to display the image frame from which the 3D scene is determined. The user interface may advantageously be further adapted to overlay a reference indicator on the 2D feature in the displayed image frame determined as closest in the 3D scene According to yet another aspect of the present invention, there is provided a method for real time extraction of 3D information having a number of data frames, the method comprising the steps of: extracting at each frame, a set of 2D features from an image frame and matched with those extracted from the previous frame such that each pair of matched features refers to the same 3D point in the scene; generating one 3D ray by back-projection from each 2D feature; inputting the 3D rays into an anchor-based minimization process to determine motion parameters and 3D scene points coordinates to recover said 3D information.

According to still another aspect of the present invention, there is also provided a computer program comprising program instructions for causing a computer program to carry out either of the above methods, which may be embodied on a record medium, carrier signal or read-only memory.

Other aspects are as set out in the claims herein.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
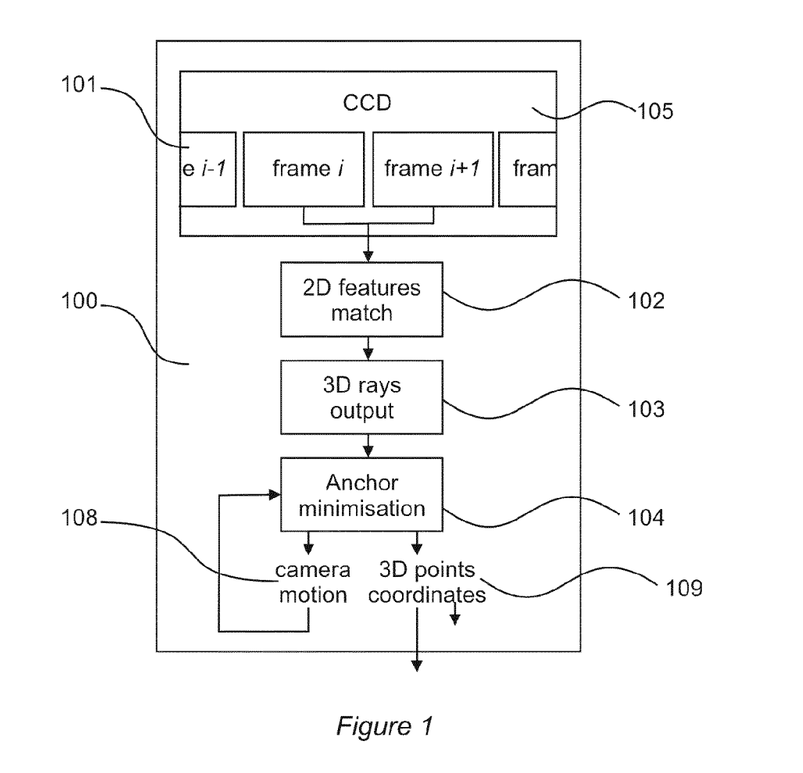
FIG. 1 shows a logical diagram of a system according to the invention embodied as a state machine.
Figure 2:
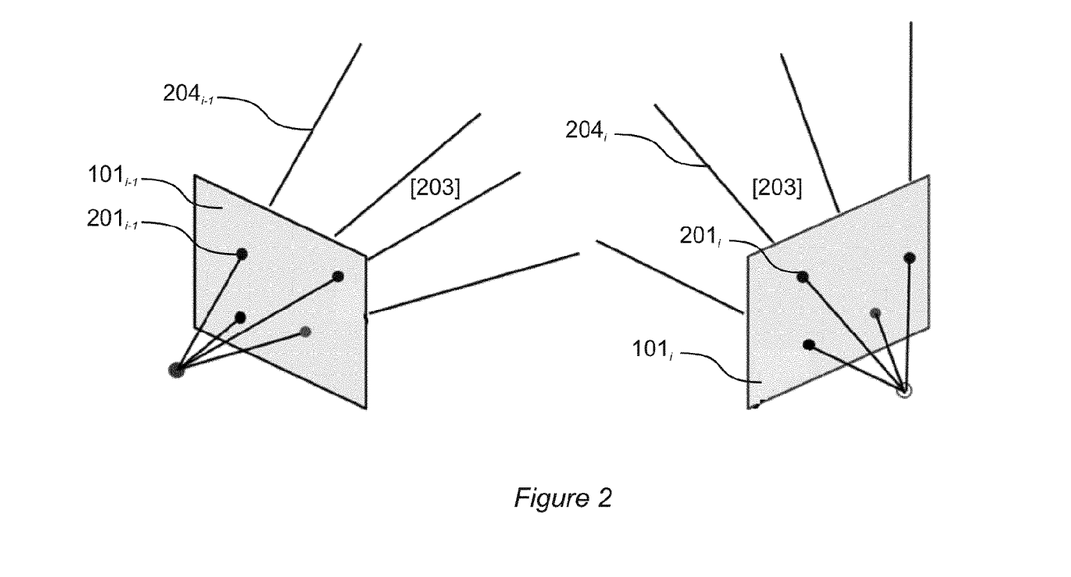
FIG. 2 illustrates sets of 2D features and corresponding 3D rays processed with the system of FIG. 1.
Figure 3:
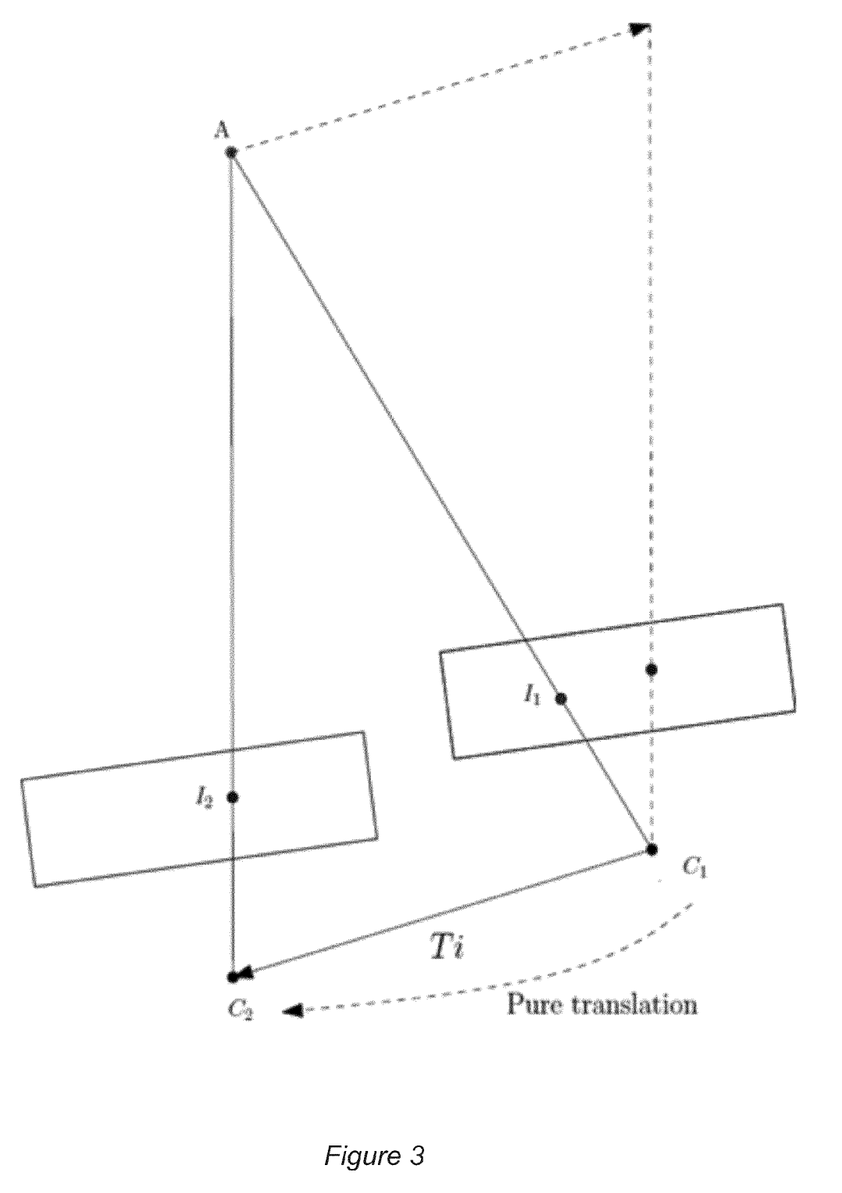
FIG. 3 illustrates initialisation of anchored motion using a pure translation with the system of FIG. 1.

With reference to FIGS. 1 to 3, a first embodiment of a system 100 according to the invention is shown as a logical diagram of a state machine comprising respective data processing modules.

A plurality of image frames 101 are continuously obtained from imaging means 105, typically at least one digital camera. A 'features matching' module 102 of the system extracts a set of 2D features $201_i$ from each successive image frame $101_i$, and matches the extracted set with the set of 2D features $201_{i-1}$ obtained for the previous image frame $101_{i-1}$, such that at least one pair of matched 2D features $201_i$, $201_{i-1}$ refers to a same 3D point $202_i$, $202_{i-1}$ in a 3D scene 203. Known methods, such as those previously introduced of Bay et al and Lowe, or a simple correlation-based approach, may be used for this module.

A 'ray generation' module 103 of the system generates a 3D ray $204_i$ by back-projection from each 2D feature $201_i$, whereby the intersection of the two 3D rays $204_i$, $204_{i-1}$ of the matched features $201_i$, $201_{i-1}$ corresponds to the related 3D points $202_i$, $202_{i-1}$. Numerous algorithms are known to the skilled person, for efficiently processing 3D rays by back-projection.

An 'anchor-based minimization' module 104 subjects the generated 3D rays $204_i$ to an anchor-based minimization process, for determining camera motion parameters 108 and 3D scene points coordinates 109, whereby a structure of said 3D scene 203 is recovered.

Camera motion is parameterized as a rotation matrix and a translation vector T. Epipolar geometry is essential to the estimation of camera motion parameters, and 7-points and 8-points algorithms may be used. L. Moisan and B. Stival (*A probabilistic criterion to detect rigid point matches between two images and estimate the fundamental matrix*, International Journal of Computer Vision, 2004) and H. C. Longuet-Higgins (*A computer algorithm for reconstructing a scene from two projections*, Nature, September 1981) respectively teach a 7-points algorithm and an 8-points algorithm.

Using a defined number of matches, respectively 7 or 8 for the first or second algorithm, a fundamental matrix F is first estimated, from which R and T can be computed by mean of singular factorization. 7 and 8 points algorithms make use of, respectively, 7 and 8 points to solve a motion that has 5 degrees of freedom (DOF). This means that the motion estimation, which the module 104 of the system 100 is required to solved, is over-determined and, in the presence of noise in the image frames 101, a unique solution does not exist, particularly as 7-points and 8-points algorithms are very sensitive to mismatches. To solve this problem, the process is iterated over a number of sets of, respectively, 7 and 8 points chosen randomly from the feature space 203. The solution having the consensus for the highest number of features $201_i$, that is the solution having a back projection error less that a pre-defined threshold when using the motion parameters under consideration, is elected as the predicted camera motion.

The motion parameters must preferably be rectified, or adjusted, with the estimated 3D points coordinates, in order to minimize the back-projection error defined as:

$$\min_{a,b} = \sum_{i=1}^{n} \sum_{j=1}^{m} v_{ij} d(Q(a_j, b_i), x_{ij})^2$$

wherein:
  d(.): Euclidian distance
  $(a_i, b_j)$: Predicted projection which is the back-projection of the estimated 3D, $a_i$, point onto the camera j having as parameter vector $b_j$.
  $x_{ij}$: The position of $i^{th}$ feature on camera j.

Processing the above rectification, in which the camera motion parameters and 3D points coordinates are adjusted simultaneously, is time-consuming, and the initialization step of this process is important, since this is a minimization process amplifying initialization errors. Using 3D ray intersection instead, the error is the distance between rays in 3D space. Consequently, an objective function has the form:

$$\min_{a,b} = \sum_{i=1}^{n} \sum_{j=1}^{m} v_{ij} d(r_{ij}, r_{ik})^2$$

wherein:
  d(.): Euclidian distance between rays in 3D.
  $r_{ij}$: The ray corresponding to feature i in the $j^{th}$ frame
  $r_{ij}$: The ray corresponding to feature i in the key frame It will be appreciated by the skilled reader, that the predicted 3D positions do not appear in the equation. This is due to the fact that a change in the rotation implies a change in the 3D position, which is the intersection of the rays in 3D space. This approach dramatically reduces the complexity of the estimation process and, therefore, its processing time and/or requirements, since the 3D points coordinates are excluded from the estimation vector.

Given two image frames $101_i$, $101_{i+1}$, the above-described adjustment varies the camera motion parameters to reduce the ray-ray error. This means that it is possible to have 3 DOF for rotation and 2 DOF for translation direction, expressed in polar coordinates. 'Anchored' motion is the process of finding and locking one DOF, so that the problem can be reduced to finding the motion using the remaining 4 DOF simultaneously, thereby reducing the problem to 4 DOF. If a point $201_i$ is selected in the 3D space, which is called the 'anchor', as the centre of rotation A rather than the camera centre, then the motion can be expressed as a convolution of two motions: an initial motion that transform a ray from the first view into the corresponding view in the second view, and a rotation around the selected anchor. The initial motion can be one or any combination of a pure translation, a pure rotation and a pure scaling. The initial motion is used to remove one DOF from the unknown variables.

An example of a pure translation is shown in FIG. 3. After setting the anchor A, the amount of pure translation of the camera, which is necessary to bring the ray connecting the camera to the anchor A for intersecting with the image plan at $I_2$, can be determined by solving:

$$Ti=(S0*(x_{I2}-x_{I1}), S0*(y_{I2}-y_{I1}), 0)$$

wherein:
  S0: The z-coordinate of the Anchor A which also the initial scale.
  $(x_{I1}, y_{I1})$ and $(x_{I2}, y_{I2})$: The coordinates of $I_1$ and $I_2$ in the local coordinates system.

To be a valid motion, any motion that can be combined with the initial motion must keep the geometric configuration between the camera centre, the image plan, the ray and the anchor substantially unchanged. Any motion can be expressed as follows:
1. Apply the initial translation Ti.
2. Translate the camera center $C_2$ along the ray $(C_2, A)$ to bring $C_2$ to A.
   This is achieved by applying the following translation:

$$Tu=(S0*x_{I2}, S0*y_{I1}, S0)$$

3. Apply a rotation Rn
4. Translate the camera center along the ray $(c_2,A)$.

The amount of translation is given in the local camera coordinates $(C_2)$ by:

$$Tn=-S*Tu$$

which corresponds, with respect to $C_1$, to:

$$Tn=-S*Rn*Tu$$

wherein S is a scale to be determined.

The overall motion can be summarized by:

$$R=Rn$$

$$T=Ti+(S0*I+S*Rn)*Tu$$

In the above equations, the only unknown variables are Rn and S, which is equivalent to the remaining 4 DOF.

Based on the anchored motion process described above, the minimization-based motion parameters estimation algorithm is thus:
1. Select a 2D feature, $I_1(x_1,y_1)$, in the first image frame $101_i(C_1)$ and its corresponding 2D feature $I_2(x_2, y_2)$ in the next image frame $101_{i+1}$ $(C_2)$, to be the Anchor A.
2. Initialise the camera motion parameter, randomly if the process loop is a first iteration, or with the camera motion parameter from the previous frame if the process loop is a subsequent iteration.
3. Apply a gradient descent minimization over R and S to minimize the error:

$$\min_{R,S} = \sum_{i=1}^{n} d(r_{i1}, \acute{r}_{i2})^2$$

wherein:

$$\acute{r}_{i2}=r_{i2}*Rn+Ti+(S0*I+S*Rn)*Tu$$

4. Return R and T.

This algorithm can estimate the camera motion parameters together with 3D points simultaneously, at least processing cost. Initializing the current estimation step using the parameters from the previous iteration allows a faster convergence, since there is a low probability of sudden motion change occurring during the few milliseconds separating two image frames.

The proposed method and system according to the invention may be usefully embodied in very many fields of application reliant on, or requiring, the real-time extraction of 3D information from 2D image frame data. Examples may include, by way of non-limitative example, a software architecture that allows combination of information from multiple standard and non-standard cameras within a single mathematical space; visual odometry to enhance location-based services for mobile telephone terminals, for instance measuring movement with an onboard camera and accurately placing the camera with respect to a real world object; augmented reality applications; mobile robotics and automated vehicle navigation and more.

The system may usefully be embodied in the onboard navigation system of large complex vehicles, including aircraft and large land transport vehicles, for instance oversize load carriers and/or irregular load carriers, such as road transporters for boats, cranes, houses and other comparable bulky items.

Figure 4:
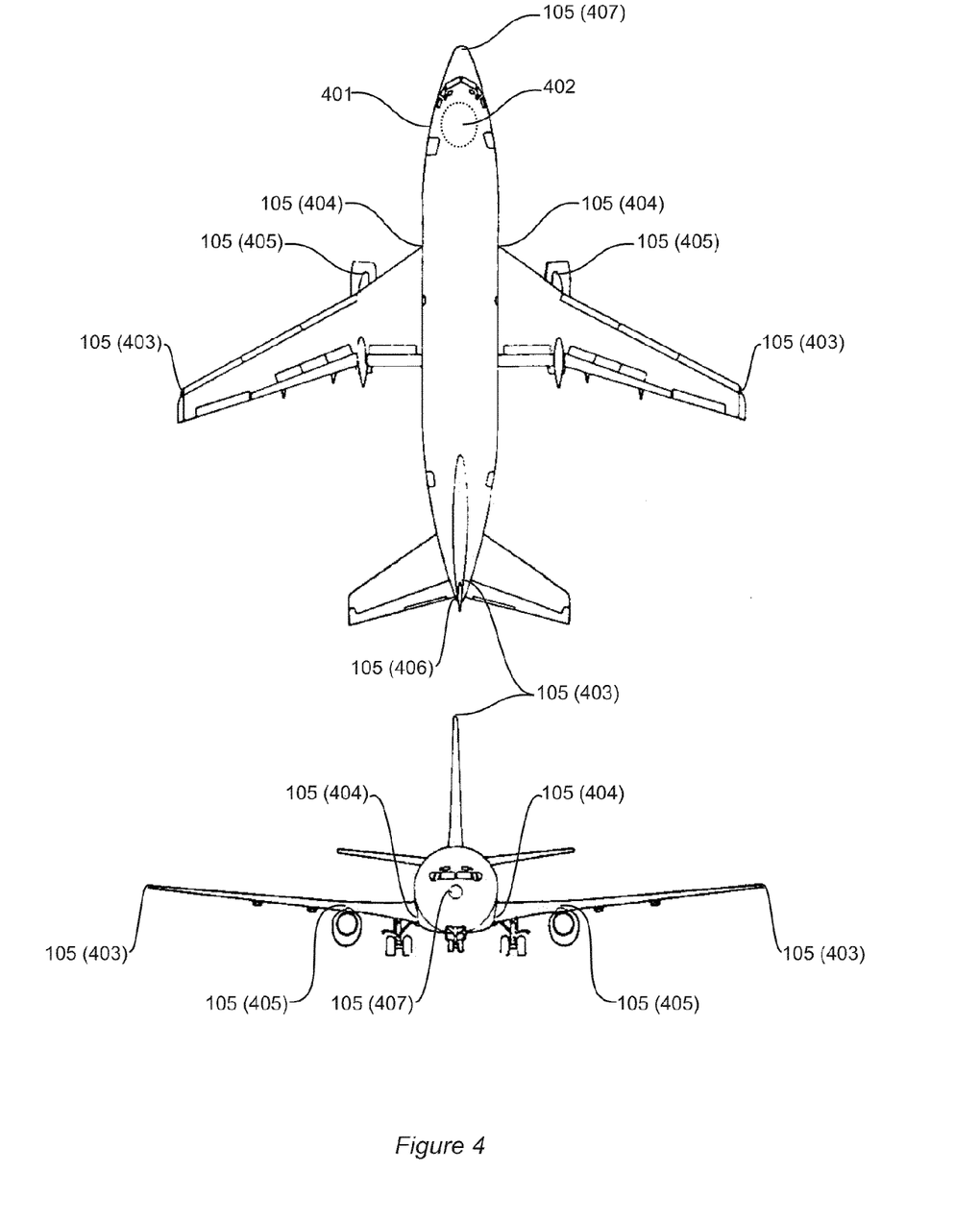
FIG. 4 shows an example application of the system of FIGS. 1 to 3 in an aircraft, according to one embodiment of the invention.

With reference to FIG. 4, in the particular case of airliners 401, the system may be embodied with a plurality of cameras 105 located about the aircraft 401 and a set of instructions embodying the method described in connection with FIGS. 1 to 3, processed by the existing onboard avionics system 402. One or more of the cameras 105 may be legacy cameras that are already part of the aircraft onboard avionics system 402, but the image frame data output $101_i$ of which is processed by the set of instructions embodying the state machine 100 of FIG. 1, as and when the aircraft onboard avionics system 402 is configured with the set of instructions.

Cameras 105 may be usefully located in unpressurized areas of the aircraft 401, such as navigation light shields 403, wing-body fairing 404, engine pylons 405, tail cone 406, nose cone 407, and others still, particularly for imaging blind spots about the aircraft 401, notably its underside. In a particularly useful embodiment, retrofitting or adapting an aircraft with the system 100 according to the invention may be facilitated with using cameras 105 that transmit image frame data 101 to the onboard avionics system with a wireless data link.

Figure 5A:
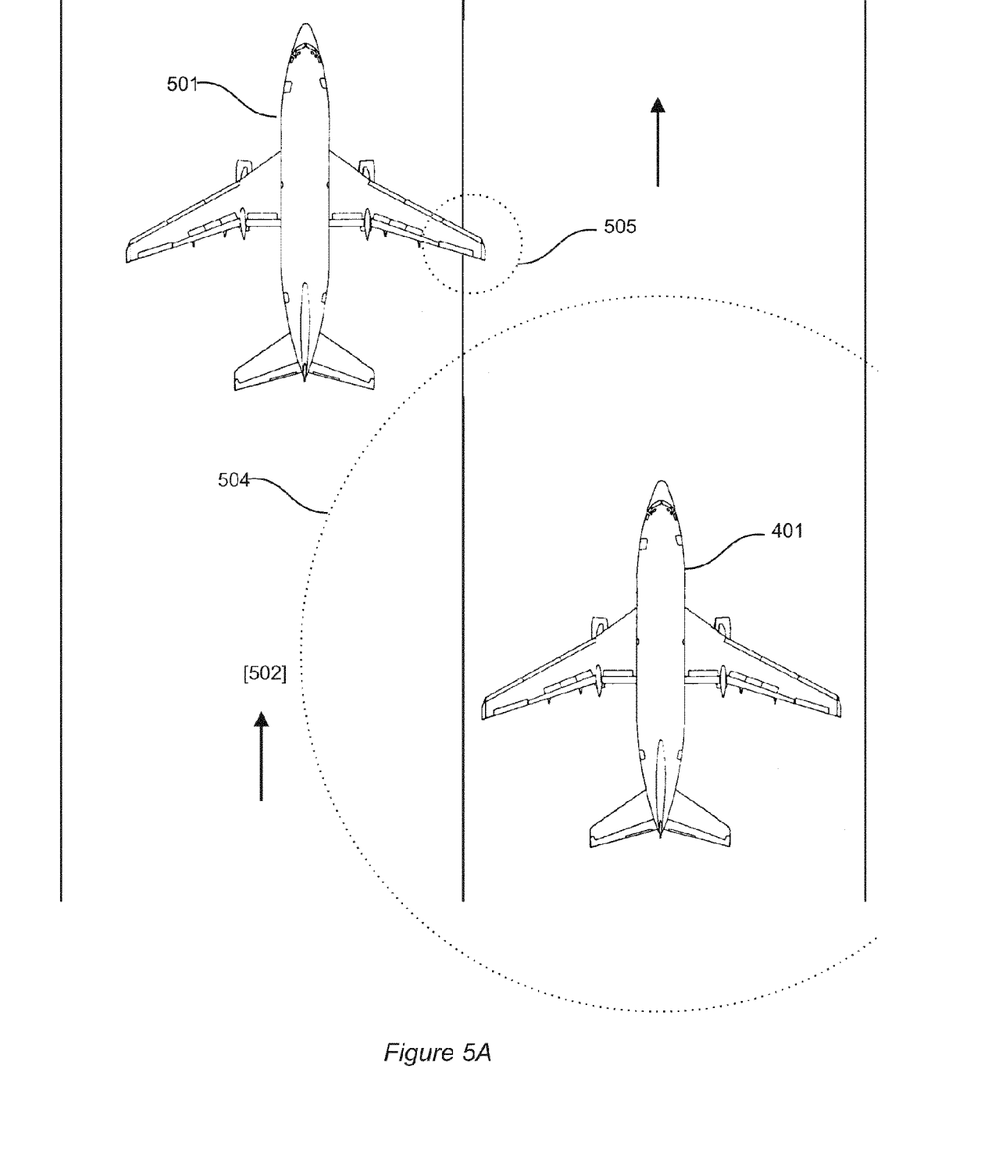
FIG. 5A shows the aircraft of FIG. 4 proximate a first aircraft.
Figure 5B:
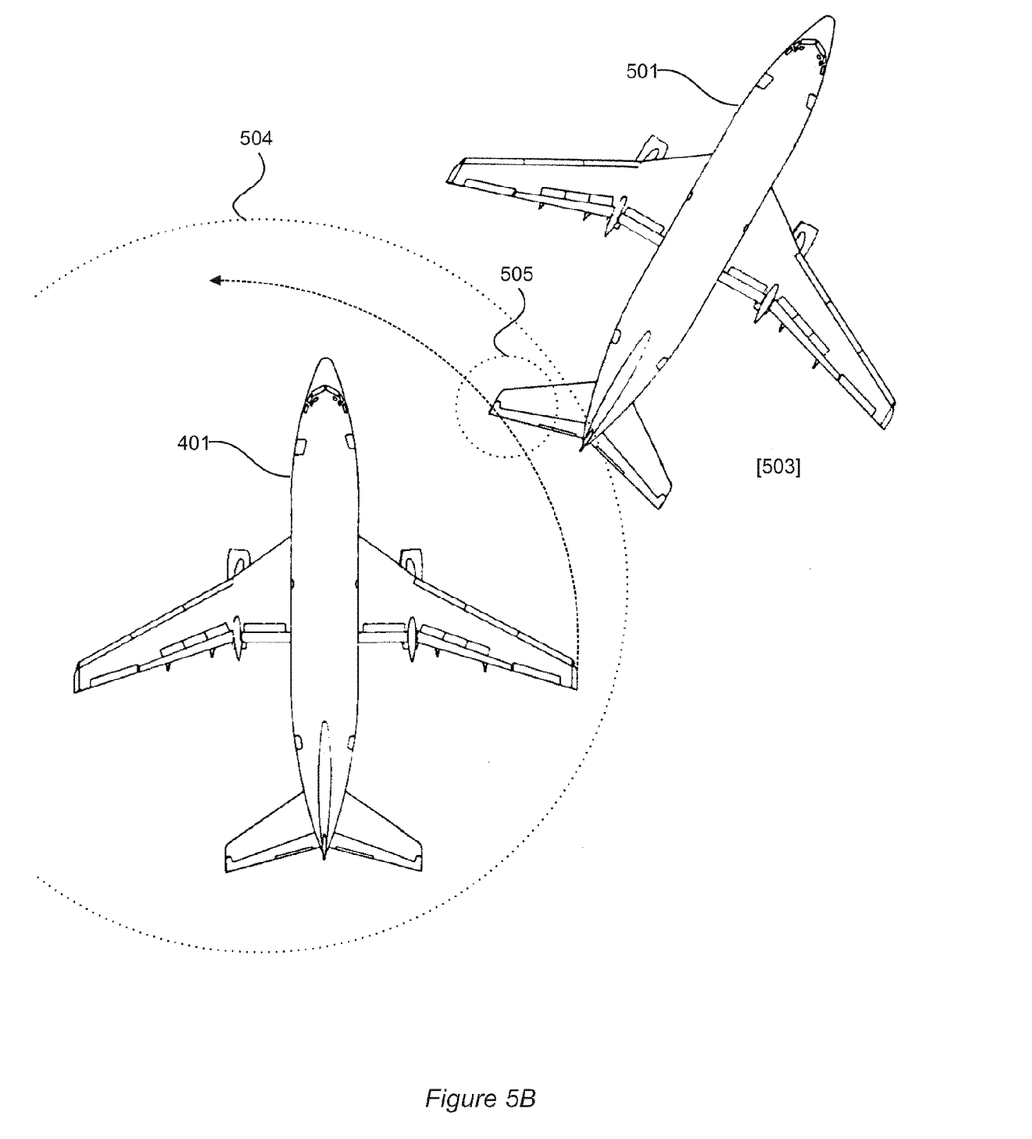
FIG. 5B shows the aircraft of FIG. 4 proximate another aircraft.

With reference to FIGS. 5A and 5B, data 101 from the cameras 105 is processed by the avionics system 402 to locate and track adjacent objects extracted as 3D points 204, for instance another airliner 501 proximate the airliner 401 in an adjacent taxiway 502 or ramp parking slot 503 during ground movement, and to generate a warning display as proximity with the adjacent object 501 reaches or exceeds a predetermined threshold, for instance expressed as a distance 504 relative to the object and/or a collision course 505.

Figure 6A:
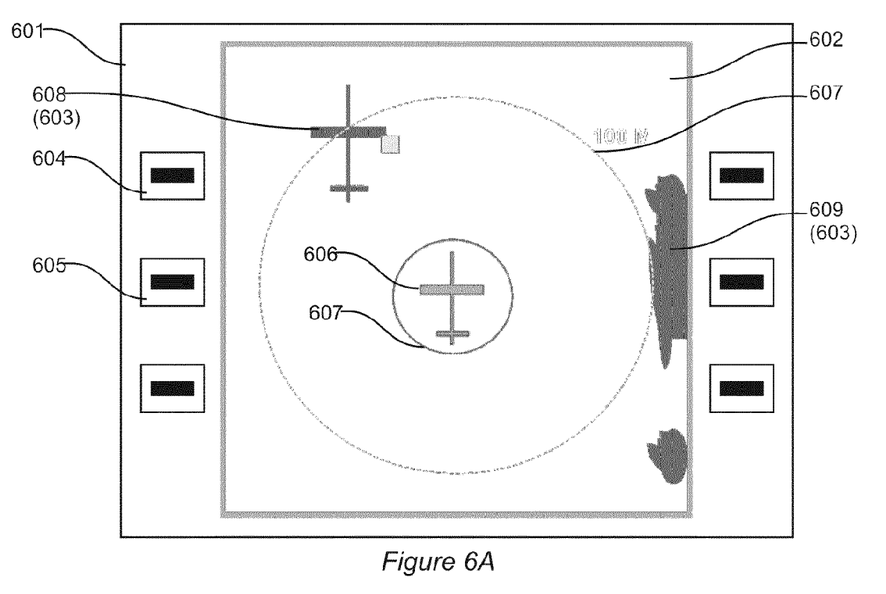
FIGS. 6A, 6B and 6C illustrates a first example of a user interface of the system of FIGS. 1 to 4 as the aircrafts of FIG. 5A draw nearer.
Figure 6B:
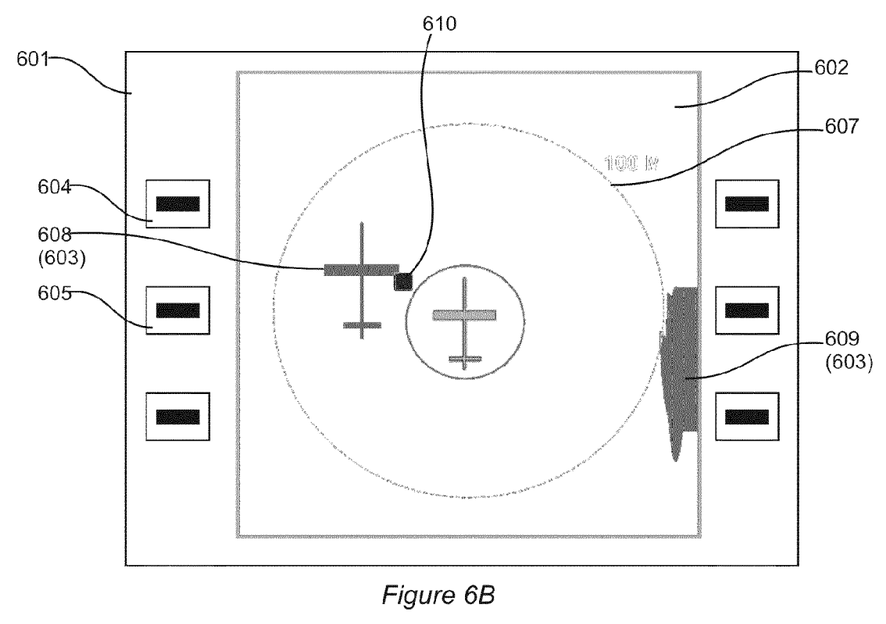
Figure 6C:
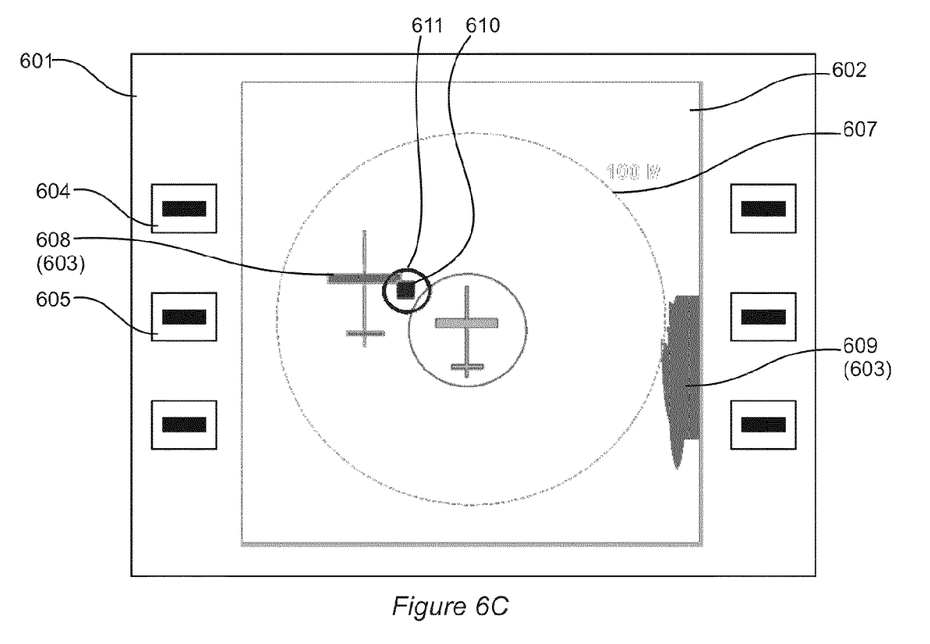

With reference to FIGS. 6A to 6C, the avionics or navigation system 402 of the airliner 401 includes at least one instrument display 601 by way of a Human-Machine Interface ('HMI') with the pilot crew, and the system 100 is adapted to configure same with a user-configurable user interface 602 in which a structure 603 of the 3D scene determined by the system 100 is output. The user interface is configurable with buttons or switches mounted adjacent the display unit 601, wherein a first switch 604 allows the pilot to activate or deactivate the system 100, and a second switch 605 allows the pilot to select the operating mode of the system 100 according to the ground manoeuvre, selected for instance from aircraft taxiing, aircraft parking, aircraft pushing back and the like. The operating mode selection may effectively correspond to a user adjustment of the range threshold 504, taking into account the range of ground speeds associated with the type of manoeuvring.

In the embodiment shown in FIGS. 6A to 6C, the user interface 602 comprises a non-moving reference indicator 606 for the aircraft 401, located substantially at the centre of the user interface, a non-moving reference indicator 607 for the distance threshold 504, centred about the non-moving reference indicator 606, and a variety of reference indicators 608 corresponding to environmental features and/or hazards determined as 3D points 204 from the camera image data 101, which the user interface translates and/or rotates relative to the non-moving reference indicators 606, 607 as the aircraft 401 moves relative to the environmental features and/or hazards.

Existing components of the onboard avionics 402 may be usefully interfaced with the system 100 in order to augment and/or correlate the information derived with the system 100, such as an onboard ground radar, laser range finder and the like, whereby the user interface 602 may comprise a further variety of reference indicators 609 corresponding to environmental features and/or hazards determined by these existing components.

At FIG. 6B, as the aircraft 401 progressively closes the distance with the other aircraft 501 in the example, the system eventually determines, with a relevant 3D transformation process, the 3D points 204 corresponding to the nearest portion of that other aircraft 501 as exceeding the distance threshold or proximity factor 504. The user interface then displays, or highlights further, a potential collision indicator 610 substantially at the user display position corresponding to that 3D point. The system 100 may additionally cause the navigation system 402 to generate an audible signal, for instance a first warning tone, when the user interface first outputs the potential collision indicator 610.

At FIG. 6C, as the aircraft 401 is still closing the distance with the other aircraft 501 in the example, the system eventually determines, with a relevant 3D transformation process, the 3D points 204 corresponding to the nearest portion of that other aircraft 501 as exceeding a second distance threshold or safety factor 504, shown in the Figures as 611. The user interface then displays an imminent collision indicator 612 substantially at the user display position corresponding to that 3D point. The system 100 may additionally cause the navigation system 402 to generate an audible signal, for instance a second warning tone, when the user interface first outputs the imminent collision indicator 612.

Figure 7:
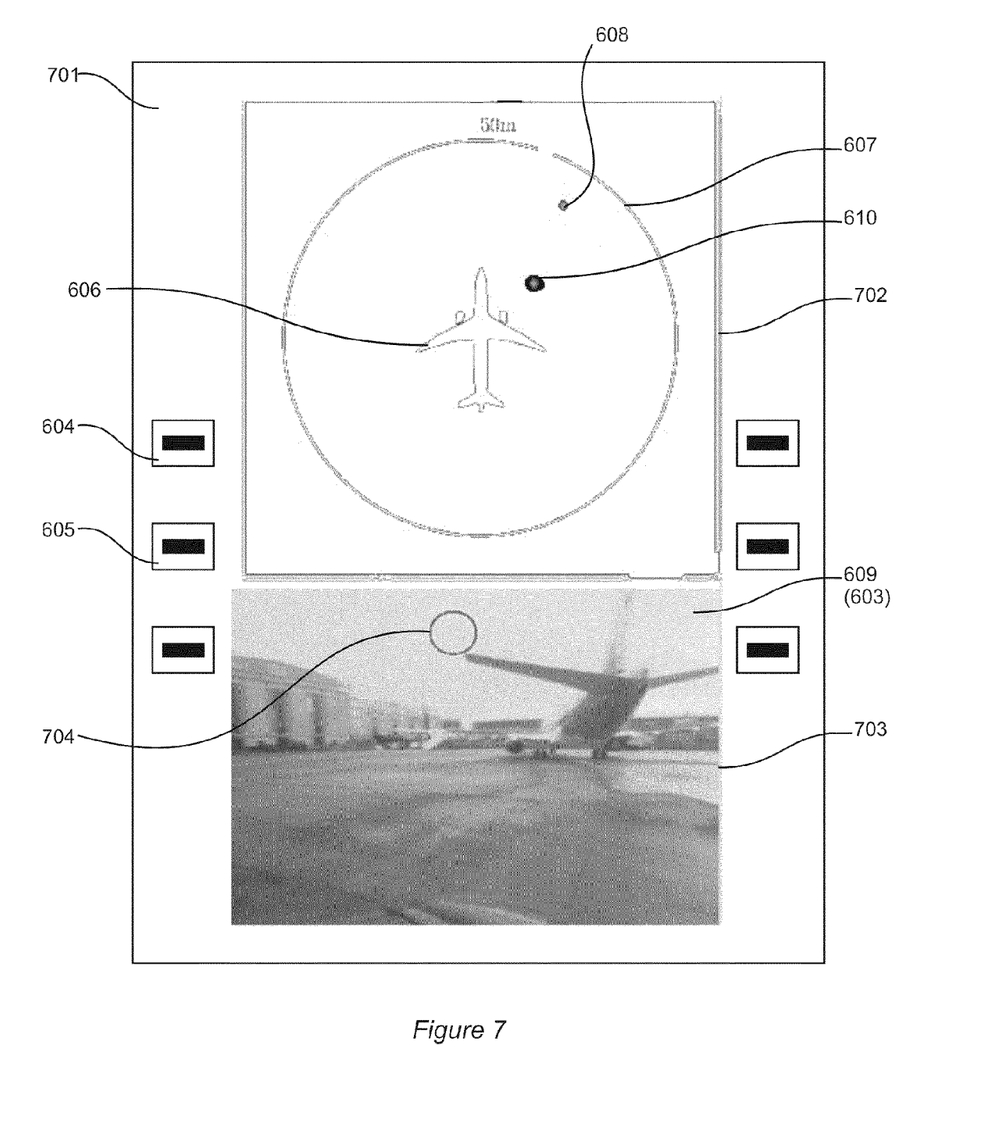
FIG. 7 illustrates a second example of a user interface of the system of FIGS. 1 to 4 as the aircrafts of FIG. 5B draw nearer.

An alternative embodiment of a user interface 701 is shown in FIG. 7 which, when the size and orientation of the at least one instrument display 601 allows, or when the navigation system 402 comprises at least two adjacent instrument displays 601, shows both the structure 603 of the 3D scene determined by the system 100 in a first portion 702 or first display 601, and the image frame data 101 from which the 3D scene determined at the same time in a second portion 703 or second display 601. The first portion 702 of the user interface 701 is again user-configurable and comprises substantially the same moving and non-moving reference indicators 609, 608, 607, 606 as described in relation to FIGS. 6A to 6C.

The second portion 703 of the user interface 701, however, is configured by the system 100 to overlay a reference indicator 704 on the 2D feature in the image frame 101 determined as closest in the 3D scene, corresponding to the portion of another aircraft 501 nearest the aircraft 401. The reference indicator 704 remains non-moving relative to the 2D feature on the display, so long as the respective positions of the two airliners 401, 501 maintain that feature as the closest in 3D space, however the reference indicator 704 scrolls on the display according to the camera field of view, substantially in real time, in correspondence to the translation, rotation and/or scaling performed to determine the 3D point, thus the movement of either airliner 401, 501 relative to the other.

Figure 8:
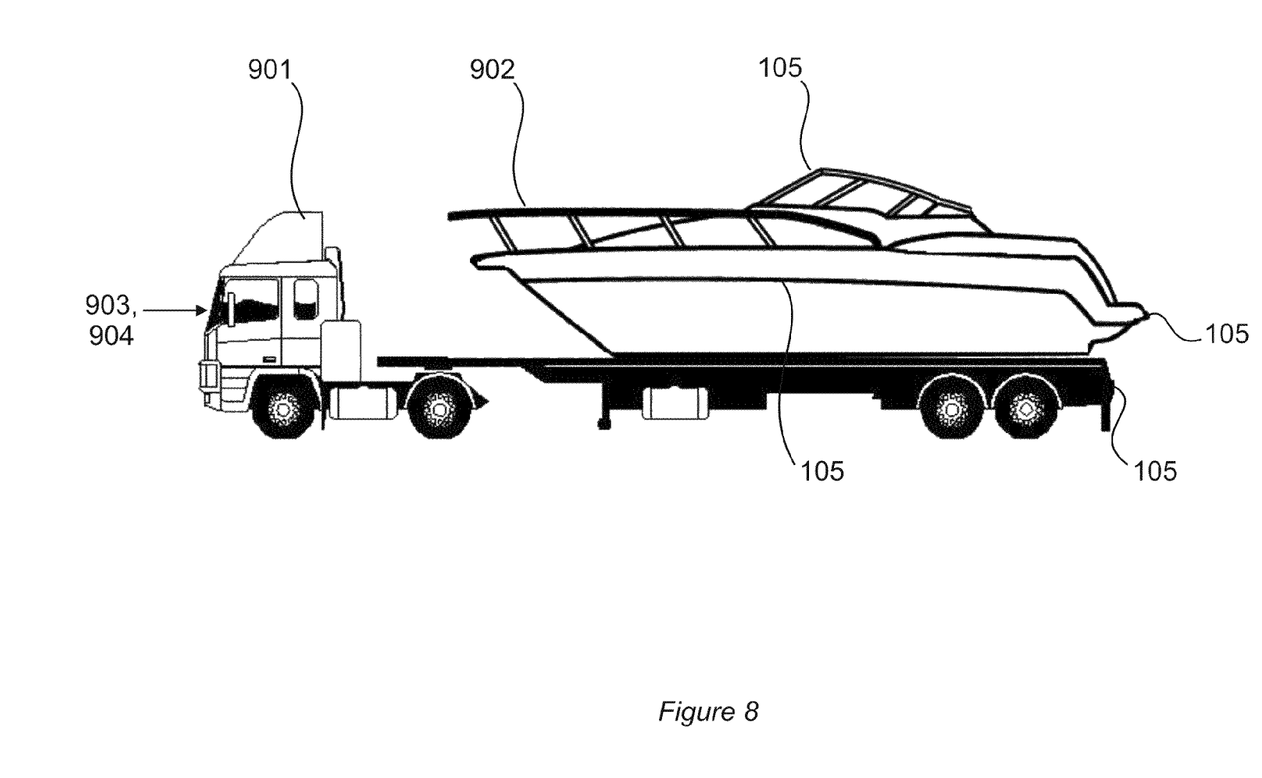
FIG. 8 shows an example application of the system of FIGS. 1 to 3 in an oversize load transport.

With reference to FIG. 8 now, in the particular case of oversize and/or irregular load carriers 901, which perform infrequent displacements and/or must accommodate a wide variety of very dissimilar loads 902, an alternative embodiment considers temporarily adapting the vehicle and/or its load with the system 100 according to the invention, with releasably securing autonomously-powered cameras 105 about the vehicle and/or load 902, wherein the cameras 105 transmit image frame data 101 over a wireless data link to either the vehicle onboard navigation system 903 or to a portable data computing device proximate the operator 904, configured with the set of instructions embodying the state machine 100 of FIG. 1. It will be appreciated that the system and invention of the method can be implemented in regular cars or SUV vehicles or the like.

Further advantageous uses of the method according to the invention include, by way of non-limitative example, single camera calibration, multi-camera calibration, SLAM, plenoptic cameras, camera motion estimation, 3D scene reconstruction, calibration of general cameras, motion or scene recovery with incomplete calibration parameters, and other uses.

The method and system according to the present invention thus improve the situational awareness of conductors and pilots of large and complex vehicles, since they provide a real time tool for assessing distances relative to both observable and non-observable collision hazards within the environment of the vehicle in motion.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of recovering a 3D scene structure from a plurality of image frames obtained from imaging means, the method comprising the steps of
   extracting a first set of 2D features from a first image frame,
   extracting a second set of 2D features from a second image frame,
   matching the second set with the first set, such that at least one pair of matched 2D features refers to a same 3D point in a 3D scene,
   generating a 3D ray by back-projection from each 2D feature,
   subjecting the generated 3D rays to an anchor-based minimization process, for determining camera motion parameters and 3D scene points coordinates, thereby recovering a structure of said 3D scene, and
   processing the determined camera motion parameters using 3D ray intersection by minimizing a function based on the Euclidian distance between the 3D rays;
   wherein the anchor-based minimization process comprises selecting a 3D point in the 3D scene as an anchor, being a centre of rotation, such that the camera motion parameters can be expressed relative to the anchor point.

2. A method according to claim 1, wherein the step of processing the determined camera motion parameters using 3D ray intersection comprises processing the parameters according to the function $$\min_{a,b} = \sum_{i=1}^{n} \sum_{j=1}^{m} v_{ij} d(r_{ij}, r_{ik})^2$$

wherein:
   each camera j is parameterized by a vector $a_j$ and each 3D point i by a vector $b_i$
   $d(.)$: Euclidian distance between 3D rays in 3D space
   $r_{ij}$: The ray corresponding to feature i in the $j^{th}$ frame
   $r_{ik}$: The ray corresponding to feature i in the key frame.

3. A method according to claim 2, whereby camera motion is expressed as a convolution of an initial motion that transform a 3D ray from the first image frame into a corresponding view in the second image frame, and a rotation around the selected anchor.

4. A method according to claim 1, wherein the initial motion is one or any combination of a pure translation, a pure rotation and a pure scaling.

5. A method according to claim 1, comprising the further step of processing the amount of pure translation of the camera for bringing the 3D ray connecting the camera to the anchor for intersecting with the image plan at $I_2$ according to the function $$Ti=(S0*(x_{I2}-x_{I1}),S0*(y_{I2}-y_{I1}),0)$$

wherein:
S0: The z-coordinate of the Anchor A which also the initial scale
$(x_{I2},y_{I2})$ and $(x_{I1},y_{I1})$: The coordinates of $I_2$ and $I_1$ in the local coordinates system.

6. A method according to claim 3, wherein the minimization-based motion parameters estimation algorithm comprises the steps of:
selecting a 2D feature, $I_1(x_1,y_1)$, in the first image frame and its corresponding 2D feature $I_2(x_2,y_2)$ in the next image frame, to be the anchor A,
initialising the camera motion parameter, randomly if the process loop is a first iteration, or with the camera motion parameter from the previous frame if the process loop is a subsequent iteration,
applying a gradient descent minimization over a rotation matrix R and a scale to be determined S to minimize the error:

$$\min_{R,S} = \sum_{i=1}^{n} d(r_{i1}, \acute{r}_{i2})^2$$

wherein:

$$\acute{r}_{i2}=r_{i2}*Rn+Ti+(S0*I+S*Rn)*Tu$$

and returning the rotation matrix R and a translation vector T.

7. A system for recovering a 3D scene structure from a plurality of image frames obtained from imaging means, said system comprising
the imaging means and
data processing means interfaced with the imaging means, and configured to extract a set of 2D features from each image frame,
match each set with a set extracted from the previous image frame, such that at least one pair of matched 2D features refers to a same 3D point in a 3D scene,
generate a 3D ray by back-projection from each 2D feature,
subject the generated 3D rays to an anchor-based minimization process, for determining camera motion parameters and 3D scene points coordinates, thereby recovering a structure of said 3D scene, and
process the determined camera motion parameters using 3D ray intersection by minimizing a function based on the Euclidian distance between the 3D rays;
wherein the anchor-based minimization process comprises selecting a 3D point in the 3D scene as an anchor, being a centre of rotation, such that the camera motion parameters can be expressed relative to the anchor point.

8. A system according to claim 7, wherein the imaging means is selected from the group comprising one or more analogue cameras, digital cameras, stereoscopic cameras, plenoptic cameras, networked cameras.

9. A system according to claim 7, wherein the imaging means is interfaced to the data processing means with a wireless data link.

10. A system according to claim 7, embodied in the onboard navigation system of a large complex vehicle such as an aircraft, land transport vehicle or sea transport vehicle.

11. A system according to claim 7, embodied in the flight management system of an airliner.

12. A non-transitory data carrying medium comprising instructions that when processed by a data processing terminal, configures the data processing terminal to perform the steps of the method according to claim 1.

13. A non-transitory data carrying medium according to claim 12, wherein the data processing terminal is onboard a vehicle.

14. A non-transitory data carrying medium according to claim 12, embodied in an aircraft user application, wherein the data processing terminal comprises an aircraft flight management system.

15. The system of claim 7, further comprising a user interface to which the recovered structure of the 3D scene is displayed.

16. A user interface according to claim 15, further comprising at least one non-moving reference indicator, located substantially at the centre of the user interface, and at least one reference indicator corresponding to an environmental feature and/or hazard determined as a 3D point from the camera image data, which the user interface translates and/or rotates relative to the at least one non-moving reference indicator in use.

* * * * *